(12) United States Patent
Gerber et al.

(10) Patent No.: US 11,936,315 B2
(45) Date of Patent: Mar. 19, 2024

(54) SENSORLESS MOTOR CONTROL BASED ON A COMMUTATION EVENT

(71) Applicant: Infineon Technologies AG, Neubiberg (DE)

(72) Inventors: Stanislav Gerber, Erfurt (DE); Bastian Schindler, Illmenau (DE); Benjamin Jahn, Illmenau (DE); Sandro Purfuerst, Illmenau (DE)

(73) Assignee: Infineon Technologies AG, Neubiberg (DE)

( * ) Notice: Subject to any disclaimer, the term of this patent is extended or adjusted under 35 U.S.C. 154(b) by 82 days.

(21) Appl. No.: 17/507,076

(22) Filed: Oct. 21, 2021

(65) Prior Publication Data

US 2023/0126824 A1 Apr. 27, 2023

(51) Int. Cl.
*H02P 21/32* (2016.01)
*H02P 21/18* (2016.01)

(52) U.S. Cl.
CPC .............. *H02P 21/32* (2016.02); *H02P 21/18* (2016.02); *H02P 2203/03* (2013.01)

(58) Field of Classification Search
CPC ....... H02P 21/32; H02P 21/18; H02P 2203/03
USPC ............................................. 318/400.01, 700
See application file for complete search history.

(56) References Cited

U.S. PATENT DOCUMENTS

| 6,396,229 B1* | 5/2002 | Sakamoto | H02P 6/18 318/723 |
| 2007/0069676 A1* | 3/2007 | MacKay | H02P 6/182 318/400.11 |
| 2020/0395876 A1 | 12/2020 | Greiner | |

FOREIGN PATENT DOCUMENTS

DE 102017009512 A1 4/2019

* cited by examiner

*Primary Examiner* — David Luo
(74) *Attorney, Agent, or Firm* — Shumaker & Sieffert, P.A.

(57) ABSTRACT

A circuit for controlling a motor that includes control circuitry configured to determine whether a commutation event has occurred for a first sector of a plurality of sectors of a cycle for the motor based on a first selected phase current signal and a second selected phase current signal. In response to a determination that the commutation event has occurred for the first sector, the control circuitry is configured to determine that the motor is operating in a second sector of the plurality of sectors of the cycle for the motor. The control circuitry is further configured to determine a second angle of stator voltage vector for the motor based on the determination that the motor is operating in the second sector and generate the control signal based on the second angle of stator voltage vector for the motor.

22 Claims, 6 Drawing Sheets

SENSORLESS MOTOR CONTROL BASED ON A COMMUTATION EVENT

TECHNICAL FIELD

This disclosure relates to circuits and techniques for generating a control signal, and more specifically, techniques for generating a control signal associated with operating or controlling an electric motor.

BACKGROUND

Operation of a motor may be performed by a controller. The controller controls a rotor rotation of the motor based on a position of the rotor relative to stator coils of the motor. For example, the controller may control inverter circuitry to provide power from a voltage rail to each phase of the motor based on the rotor position to provide a desired rotor speed and/or torque.

SUMMARY

In general, this disclosure is directed to techniques for determining an angle of a voltage vector for sensorless motor operation that remains accurate under unknown load conditions and/or at low speed (e.g., during a start-up process of the motor). As used herein, a voltage vector may include a summarized value (e.g., an imaginary value) that represents all three phase voltages (e.g., three physical values). For example, control circuitry may identify a first selected phase current signal indicating a current direction and a second selected phase current signal indicating the current direction of the first selected phase current signal from three phases of the motor. In this example, the control circuitry may detemiine whether a commutation event has occurred based on the first selected phase current signal and the second selected phase current signal. In response to a determination that the commutation event has occurred, the control circuitry may determine that the motor is operating in a next sector of a plurality of sectors of a cycle for the motor.

In one example, this disclosure describes a circuit for controlling a motor. The circuit includes control circuitry configured to generate a control signal for controlling the motor based on a first angle of stator voltage vector for the motor. The first angle of stator voltage vector is associated with a first sector of a plurality of sectors of a cycle for the motor. The control circuitry is further configured to identify, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal. The control circuitry is further configured to determine whether a commutation event has occurred for the first sector based on the first selected phase current signal and the second selected phase current signal and, in response to a determination that the commutation event has occurred for the first sector, determine that the motor is operating in a second sector of the plurality of sectors of the cycle for the motor. The control circuitry is further configured to determine a second angle of stator voltage vector for the motor based on the determination that the motor is operating in the second sector and generate the control signal based on the second angle of stator voltage vector for the motor.

In another example, this disclosure describes a method comprising generating a control signal for controlling a motor based on a first angle of stator voltage vector for the motor. The first angle of stator voltage vector is associated with a first sector of a plurality of sectors of a cycle for the motor. The method further comprises identifying, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal. The method further comprises determining whether a commutation event has occurred for the first sector based on the first selected phase current signal and the second selected phase current signal and, in response to determining that the commutation event has occurred for the first sector, determining that the motor is operating in a second sector of the plurality of sectors of the cycle for the motor. The method further comprises determining a second angle of stator voltage vector for the motor based on the determination that the motor is operating in the second sector and generating the control signal based on the second angle of stator voltage vector for the motor.

In another example, this disclosure describes a system comprising a motor, driver circuitry configured to drive the motor based on a control signal, and control circuitry. The control circuitry is configured to generate the control signal for controlling the motor based on a first angle of stator voltage vector for the motor. The first angle of stator voltage vector is associated with a first sector of a plurality of sectors of a cycle for the motor. The control circuitry is further configured to identify, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal. The control circuitry is further configured to determine whether a commutation event has occurred for the first sector based on the first selected phase current signal and the second selected phase current signal, and in response to a determination that the commutation event has occurred for the first sector, determine that the motor is operating in a second sector of the plurality of sectors of the cycle for the motor. The control circuitry is further configured to determine a second angle of stator voltage vector for the motor based on the determination that the motor is operating in the second sector and generate the control signal based on the second angle of stator voltage vector for the motor.

In another example, this disclosure describes a non-transitory computer-readable storage medium having stored thereon instructions that, when executed, cause control circuitry to generate a control signal for controlling the motor based on a first angle of stator voltage vector for the motor, wherein the first angle of stator voltage vector is associated with a first sector of a plurality of sectors of a cycle for the motor. The instructions further cause the control circuitry to identify, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal. The instructions further cause the control circuitry to determine whether a commutation event has occurred for the first sector based on the first selected phase current signal and the second selected phase current signal and, in response to a determination that the commutation event has occurred for the first sector, determine that the motor is operating in a second sector of the plurality of sectors of the cycle for the motor. The instructions further cause the control circuitry to determine a second angle of stator voltage vector for the motor based on the determination that the motor is operating in the second sector and generate the control signal based on the second angle of stator voltage vector for the motor.

Details of these and other examples are set forth in the accompanying drawings and the description below. Other features, objects, and advantages will be apparent from the description and drawings, and from the claims.

DETAILED DESCRIPTION

Figure 1:
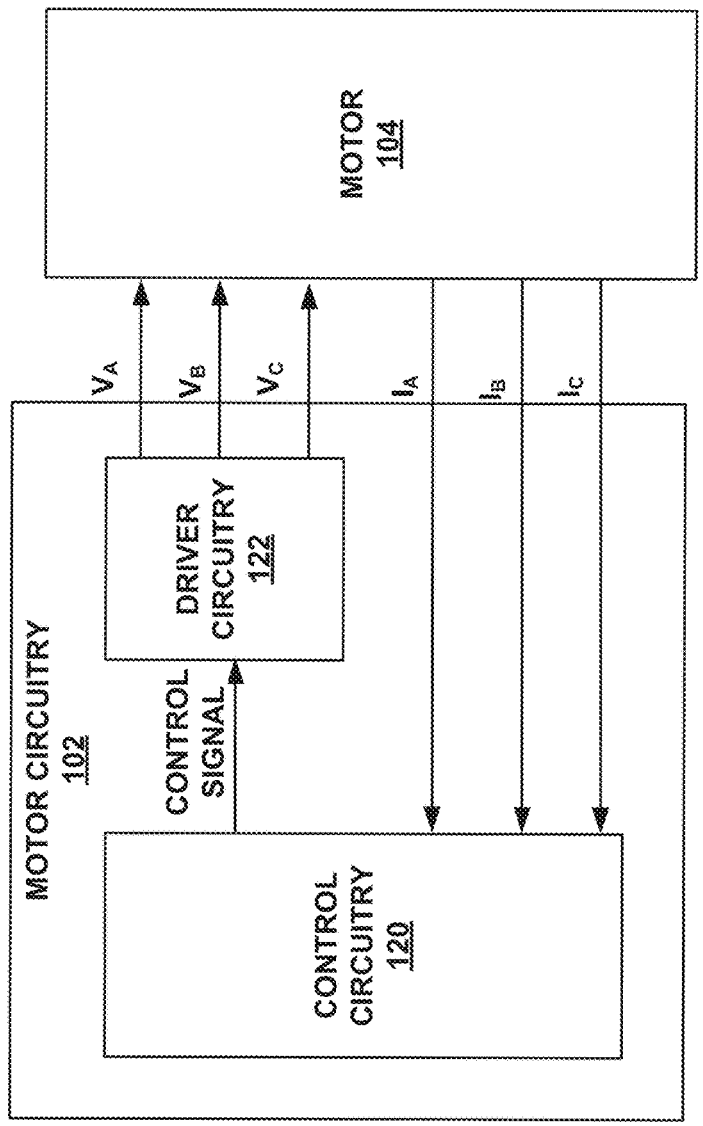
FIG. 1 is a block diagram illustrating an example system for controlling a motor, in accordance with one or more techniques of this disclosure.

This disclosure is directed to techniques for determining an angle of a stator voltage vector for sensorless motor operation that remains accurate under unknown load conditions and/or at low speed (e.g., a start-up process of the motor). A control circuitry may determine the angle of the stator voltage vector in order to permit sensorless motor operation, which may allow a removal or omission of position sensors in a PMSM (Permanent Magnet Synchronous Machine) or a BLDG; motor (Brushless DC motor).

Examples of sensorless motor operation may include an estimator control (e.g., active flux control or Back-EMF control), a Back-EMF ("BEMF") measurement control, current injection control, a voltage/frequency ("V/F") control, and/or a current/frequency ("I/F") control. Estimator control may provide a relatively high efficiency (e.g., for field-oriented control) but may not the accurate at a relatively low rotor speed of the motor. BEMF measurement control may provide a direct measurable physical value but may not be accurate at low speeds and may rely on additional measurement hardware, which may increase a cost. Current injection control may the accurate at low speeds and may provide a control output at a rotor standstill but may comprise relatively high acoustic noise. In addition to acoustic noise, current injection current injection control may result in high electromagnetic emission.

V/F control may be accurate at low speeds but only for known loads, may offer relatively low or moderate efficiency, and may rely on feedforward speed control (e.g., no feedback speed control). control may be accurate at low speeds and may be configurable for a maximum load but may offer relatively low or moderate efficiency, and relies on feedforward speed control.

Rather than relying on an estimator control, BEMF measurement control, current injection control, V/F control, and I/F control, which may comprise the above identified deficiencies, the techniques described herein may include generating commutation information (e.g., phase voltages to be applied) based on phase current information. For example, a control unit may generate a control voltage angle based on the difference of two phase current signals with an equal sign. In this example, the control unit may generate the control voltage amplitude using an output control algorithm.

For example, a control circuitry may identify a first selected phase current signal indicating a current direction and a second selected phase current signal indicating the current direction of the first selected phase current signal from three phases of the motor. In this example, the control circuitry may determine whether a commutation event has occurred based on the first selected phase current signal and the second selected phase current signal. In response to a determination that the commutation event has occurred, the control circuitry may determine that the motor is operating in a next sector of a plurality of sectors of a cycle for the motor. In this way, the control circuitry may determine a position (e.g., a particular sector of a plurality of sectors of a cycle for the motor) using feedback (e.g., phase current), which may increase an efficiency of the motor, particularly, in where the motor is under an unknown load condition and/or at a low speed. Techniques described herein to determine whether a commutation event has occurred may provide motor control with feedback (e.g., not only feedforward), that is accurate at relatively low rotor speeds of the motor, that is sensorless, that is relatively simple, that is robust (e.g., load independent), and that is independent of motor parameters.

FIG. 1 is a block diagram illustrating an example system for controlling a motor, in accordance with one or more techniques of this disclosure. As illustrated in the example of FIG. 1, system 100 may include motor circuitry 102 and motor 104. Motor circuitry 102 may include control circuitry 120 and driver circuitry 122. In some examples, however, driver circuitry 122 may be separate from motor circuitry 102.

Motor 104 may include, for example, a permanent magnet synchronous motor (PMSM), an externally excited motor, or an asynchronous motor. Motor 104 may operate as only a load to produce mechanical energy, only a generator to produce electrical energy, or both a motor and a generator. For example, a PMSM may include a shaft, rotor, stator, and permanent magnet. A permanent magnet may be mounted on or in the rotor. In some examples, the permanent magnet may be surface mounted to the rotor, inset in the rotor, or buried within the rotor.

Driver circuitry 122 may be configured to drive motor 104 based on the control signal. For example, driver circuitry 122 may control one or more switching elements to provide a first phase voltage ($V_A$), a second phase voltage ($V_B$), and a third phase voltage ($V_C$) to motor 104. For instance, driver circuitry 122 may PWM switch, for a Sector I, each phase voltage to the supply voltage or the reference voltage based on the stator voltage vector.

Control circuitry 120 may be configured to generate a control signal based on a first phase current signal ($I_A$) indicating a current flow at a first phase of motor 104, a second phase current flow signal ($I_B$) indicating current flow at a second phase of motor 104, and a third phase current signal ($I_C$) indicating current flow at a third phase of motor 104. Control circuitry 120 may include one or more processors, such as one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

In accordance with the techniques of the disclosure, control circuitry 120 may generate a control signal for controlling motor 104 based on a first angle of stator voltage vector for the motor. For example, the first angle of stator voltage vector may be associated with a first sector of a plurality of sectors of a cycle for motor 104. Control circuitry 120 may output the control signal to driver circuitry 122, which may provide voltage to motor 104. For example, driver circuitry 122 may control a set of switching elements for one sector of a set of six sectors that each represent 60°. Although this disclosure may refer to a "first sector", the first sector may generally to refer to any sector corresponding to a beginning of a cycle (e.g., 0°-60°) or another cycle (e.g., 60°-120°, 120°-180°, 180°-240°, 240°-300, or 300°-360°). While the foregoing example used a system where a plurality of sectors is six sectors, other examples may use fewer than six sectors or more than six sectors. Moreover, incrementing the sector (e.g., incrementing an angle of the stator voltage vector by 60°) may refer to either a clockwise rotation or a counter-clockwise of a rotor of motor 104.

Control circuitry 120 may identify, from a first phase current signal ($I_A$) indicating current flow at a first phase of motor 104, a second phase current signal ($I_B$) indicating current flow at a second phase of motor 104, and a third phase current signal ($I_C$) indicating current flow at a third phase of motor 104, a first selected phase current signal indicating a current direction and a second selected phase current signal indicating the current direction of the first selected phase current signal.

Control circuitry 120 may determine whether a commutation event has occurred for the first sector based on the first selected phase current signal and the second selected phase current signal. For example, control circuitry 120 may determine that the commutation event has occurred for the first sector in response to a determination that, at a first time, that the first selected phase signal changes from being greater than the second selected phase signal to less than the second selected phase signal and a determination that, at a second time, that the first selected phase signal changes from being less than the second selected phase signal to greater than the second selected phase signal. In some examples, control circuitry 120 may determine that the commutation event has occurred for the first sector in response to a determination that a difference between the first selected phase signal and the second selected phase signal is increasing from a local minimum for the first cycle.

In response to a determination that the commutation event has occurred for the first sector, control circuitry 120 may determine that motor 104 is operating in a second sector of the plurality of sectors of the cycle for motor 104. For example, control circuitry 120 may increment the first angle of stator voltage vector by 60 degrees to generate the second angle of stator voltage vector. For instance, control circuitry 120 may determine that motor, which was operating in a sector corresponding to 120°-180° is now operating in a sector corresponding to 180°-240°. Control circuitry 120 may determine a second angle of stator voltage vector for motor 104 based on the determination that motor 104 is operating in the second sector. Control circuitry 120 may generate the control signal based on the second angle of stator voltage vector for motor 104. For example, controller circuitry 120 may generate the control signal to indicate a sector corresponding to 180°-240° and/or an indication of a set of phase voltages (e.g., $V_A$, $V_B$, $V_C$) associated with the sector corresponding to 180°-240°. Control circuitry 120 may output the control signal to driver circuitry 122. Driver circuitry 122 may drive motor 104 based on the control signal. For instance, driver circuitry 122 may provide the set of phase voltages (e.g., $V_A$, $V_B$, $V_C$). While the above examples describes incrementing the first angle of stator voltage vector by 60 degrees, increasing the angle of stator voltage vector may refer to a direction of rotation of the rotor of motor 104 that is clockwise or counter-clockwise. Moreover, in some examples, driver circuitry 122 may instead decrement the first angle of stator voltage vector by 60 degrees to generate the second angle of stator voltage vector.

Figure 2:
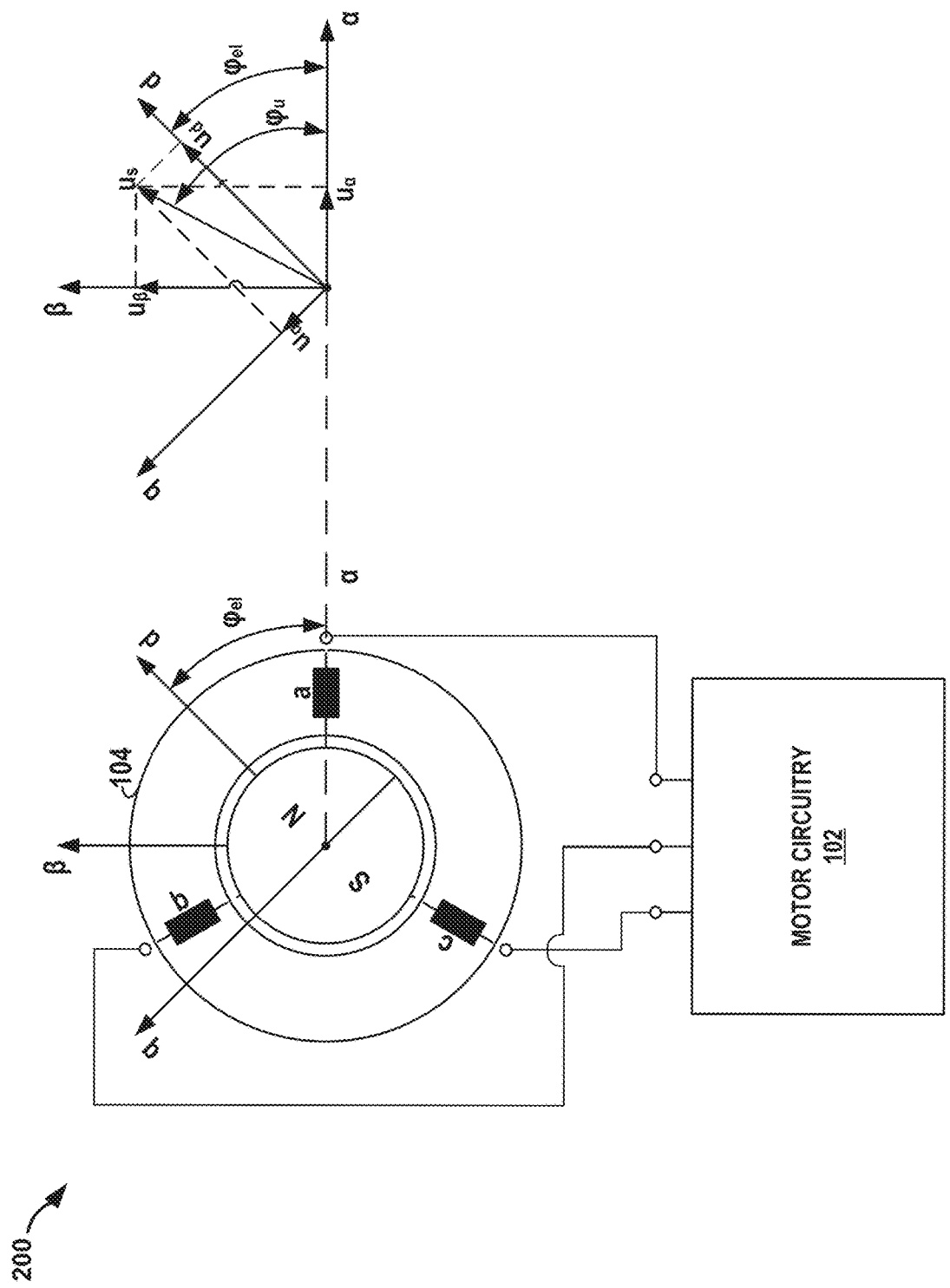
FIG. 2 is a conceptual diagram illustrating an example of motor circuitry controlling a motor and an illustration of an example of a stator voltage vector, in accordance with one or more techniques of this disclosure.

FIG. 2 is a conceptual diagram illustrating an example of motor circuitry controlling motor 104, in accordance with one or more techniques of this disclosure. In this example, motor 104 comprises a 3-phase PMSM/BLDC (e.g., with a wye connection or a delta connection), which is connected to motor circuitry 102. In the example of FIG. 2. motor 104 comprises a first phase (a), a second phase (h), and a third phase (c), Motor circuitry 102 may apply voltages to motor 104 and may evaluate the signals for the described method. For example, motor circuitry 102 may apply voltages $V_A$, $V_B$, $V_C$ of FIG. 1 to motor 104 and may evaluate the resulting phase currents $I_A$, $I_B$, $I_C$ of motor 104.

The control voltage vector us can be represented in polar coordinates (voltage amplitude+angle $\varphi_u$. Motor circuitry 102 (e.g., control circuitry 120) may generate the control vector us for motor startup and continuous motor operation based on a control voltage angle ($\varphi_u$) and a control voltage amplitude us. Motor circuitry 102 (e.g., control circuitry 120) may generate the control voltage angle based on the difference of two phase current signals with an equal sign. Motor circuitry 102 (e.g., control circuitry 120) may generate the control voltage amplitude using an output control algorithm.

Figure 3A:
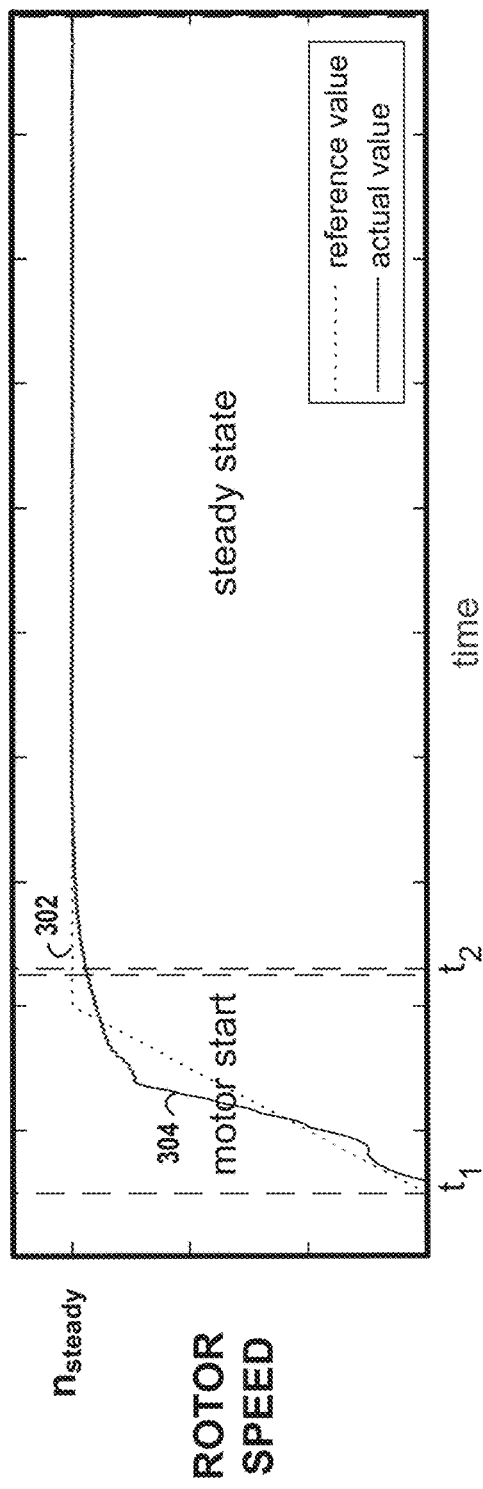
FIGS. 3A and 3B are graphs illustrating an example rotor speed and control voltage amplitude for a motor start and for steady state, in accordance with one or more techniques of this disclosure.
Figure 3B:
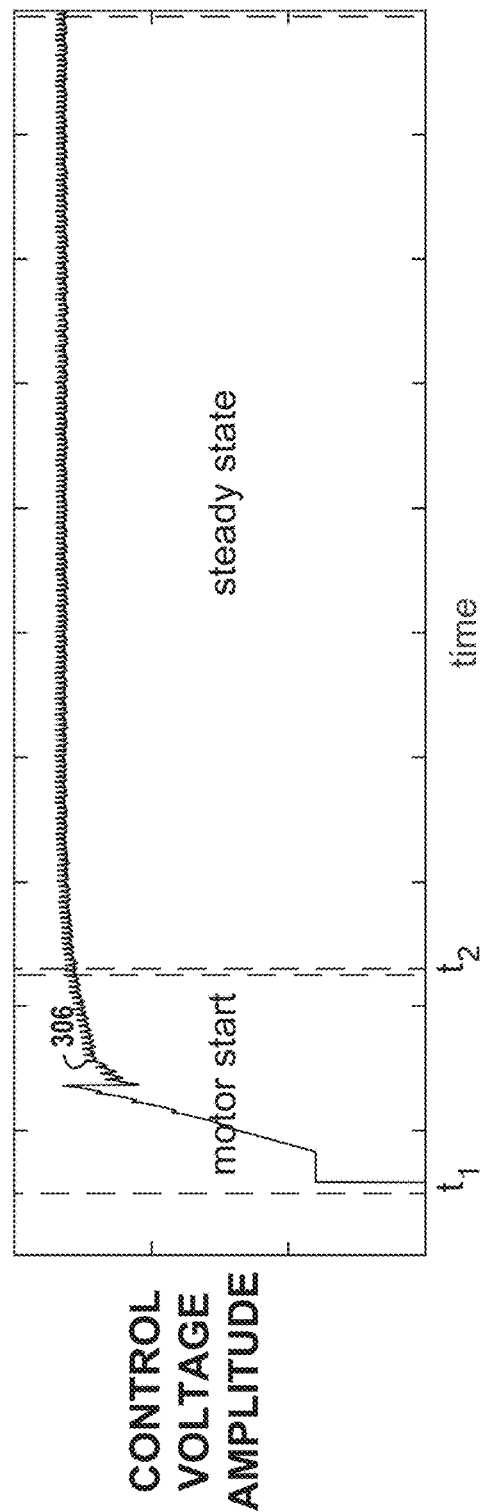

FIGS. 3A and 3B are graphs illustrating an example rotor speed and control voltage amplitude for a motor start and for steady state, in accordance with one or more techniques of this disclosure. The abscissa axis of FIG. 3A represents time (t) and the ordinate axis of FIG. 3A represents a reference rotor speed 302 and an actual rotor speed 304. The abscissa axis of FIG. 3B represents time (t) and the ordinate axis of FIG. 3B represents control voltage amplitude 306. The examples of FIGS. 3A and 3B are discussed with reference to FIGS. 1-2 for example purposes only.

FIG. 3A illustrates a speed curve for a motor start phase (e.g., between $t_1$ and $t_2$) and a steady state phase (e.g., after $t_2$) for a closed loop operation of motor 104. Control circuitry 120 may generate reference rotor speed 302 and may control the rotor speed of motor 104 based on the reference rotor speed 302. For example, a speed controller (e.g., motor circuitry 102) may generate control voltage amplitude 306 of FIG. 3B based on reference rotor speed 302 of FIG. 3A and an actual rotor speed. Control circuitry 120 may generate the control voltage angle based on the difference of the two phase current signals with an equal sign.

For example, control circuitry 120 may determine a rotor speed for motor 104 based on a duration of a first sector. In this example, control circuitry 120 may determine a control voltage amplitude based on the rotor speed. Control circuitry 120 may generate the control signal to indicate the control voltage amplitude. For instance, control circuitry 120 may apply proportional integral (PI) control based on the rotor speed. In some instances, however, control circuitry 120 may apply techniques other than PI control to generate the control signal to indicate the control voltage amplitude.

Figure 4:
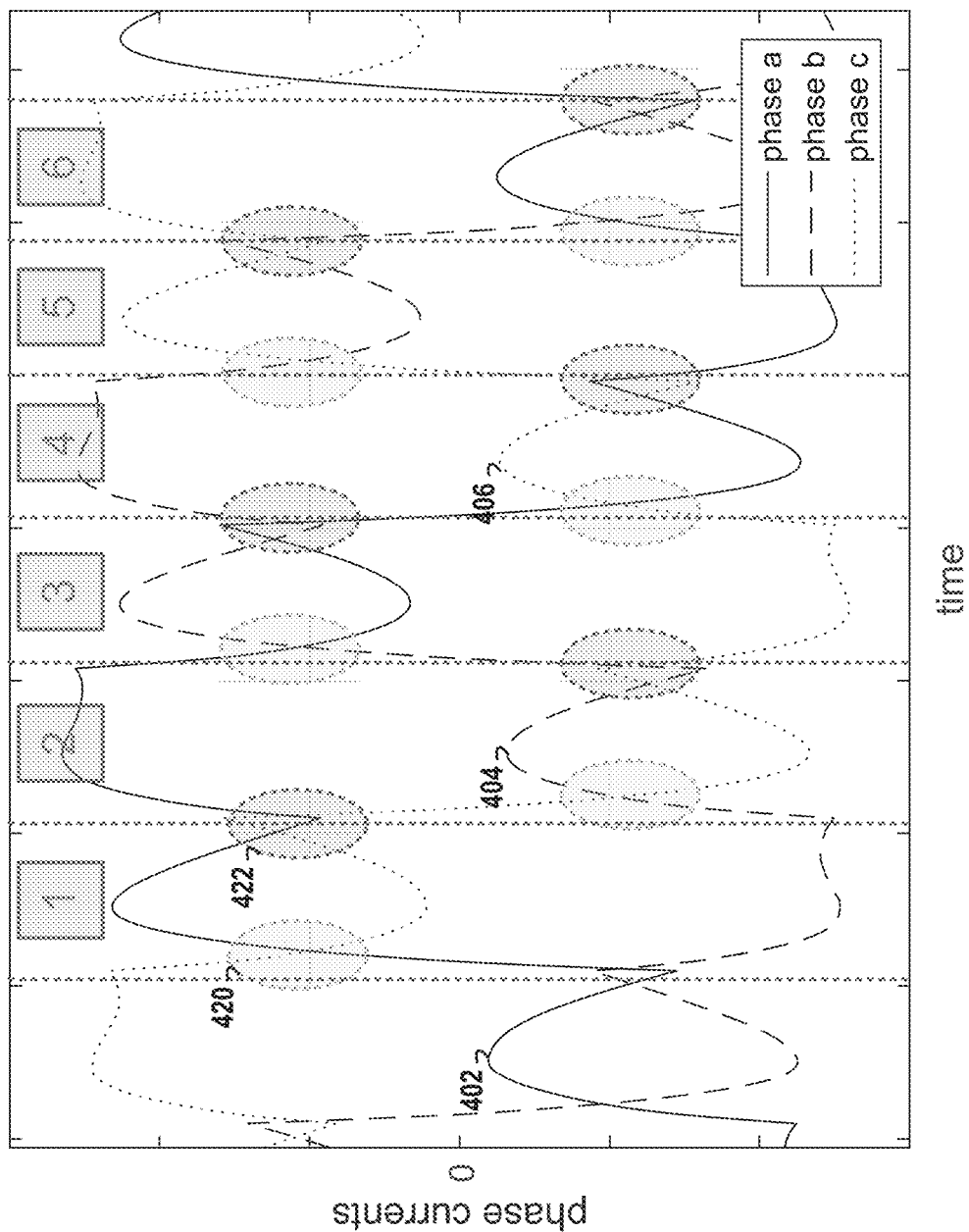
FIG. 4 is a conceptual timing diagram illustrating an example of phase currents for a motor with first example commutation events, in accordance with one or more techniques of this disclosure.

FIG. 4 is a conceptual timing diagram illustrating an example of phase currents for motor 104 with first example commutation events, in accordance with one or more techniques of this disclosure. The abscissa axis of FIG. 4 represents time (t) and the ordinate axis of FIG. 4 represents a first phase current signal 402, a second phase current signal 404, and a third phase current signal 406. The example of FIG. 4 is discussed with reference to FIGS. 1-3 for example purposes only.

For continuous rotating motor operation, motor circuitry 102 (e.g., control circuitry 120) may divide the ongoing operation into cycles, where one cycle is one electrical period (360°) and furthermore one cycle is divided into 6 sectors. Each sector may consists of 60° and the first sector starts at 0° of the electrical period. However, in some examples, the electrical period may start at a different angle of the electrical period.

In the example of FIG. 3, control circuitry 120 may perform 4 execution steps per sector. In a start step/initializing step, control circuitry 120 may generate the control signal based on a first angle of stator voltage vector for motor 104 (e.g., 0°, 60°, 120°, 180°, 240° or 300°). For instance, control circuitry 120 may determine the first angle of stator voltage vector for motor 104 to be identical to the angle of the stator voltage vector for motor 104 from the end step of the previous sector.

In an excitation change phase step, control circuitry 120 may increase angle of stator voltage vector by 60°. In a wait step analysis step, control circuitry 120 may analyze the difference of the two phase current signals with equal sign until a commutation event is detected. For example, control circuitry 120 may identify, from first phase current signal 402 indicating current flow at a first phase of motor 104, a second phase current signal 404 indicating current flow at a second phase of motor 104, and a third phase current signal 406 indicating current flow at a third phase of motor 104, a first selected phase current signal indicating a current direction and a second selected phase current signal indicating the current direction of the first selected phase current signal. For instance, control circuitry 120 may identify third phase current signal 406 as the first selected phase current and first phase current signal 402 as the second selected phase current because first phase current signal 402 and third phase current signal 406 both have a positive current direction in the sector 1. While this example uses sector 1 as a first sector, other examples may use one of sectors 1-6 as the first sector.

In this example, control circuitry 120 may determine whether a commutation event has occurred for the first sector based on the first selected phase current signal and the second selected phase current signal. For example, motor circuitry 102 (e.g., control circuitry 120) may determine, at a first time 420, that the first selected phase signal (e.g., third phase current signal 406) changes from being greater than the second selected phase signal (e.g., first phase current signal 402) to less than the second selected phase signal and determine, at a second time 422, that the first selected phase signal changes from being less than the second selected phase signal to greater than the second selected phase signal.

In an end step, motor circuitry 102 (e.g., control circuitry 120) may increase the sector by 1 (e.g., if current sector is sector 6 proceed with sector 1). For example, in response to a determination that the commutation event has occurred for the first sector (e.g., sector 1), motor circuitry 102 may determine that motor 104 is operating in a second sector (e.g., sector 2). Motor circuitry 102 (e.g., control circuitry 120) may determine a second angle of stator voltage vector for motor 106 based on the determination that the motor is operating in the second sector. For example, motor circuitry 102 (e.g., control circuitry 120) may determine the second angle of stator voltage vector to be 60° (e.g., up from 0°) and generate the control signal based on the second angle of stator voltage vector for motor 104.

Figure 5:
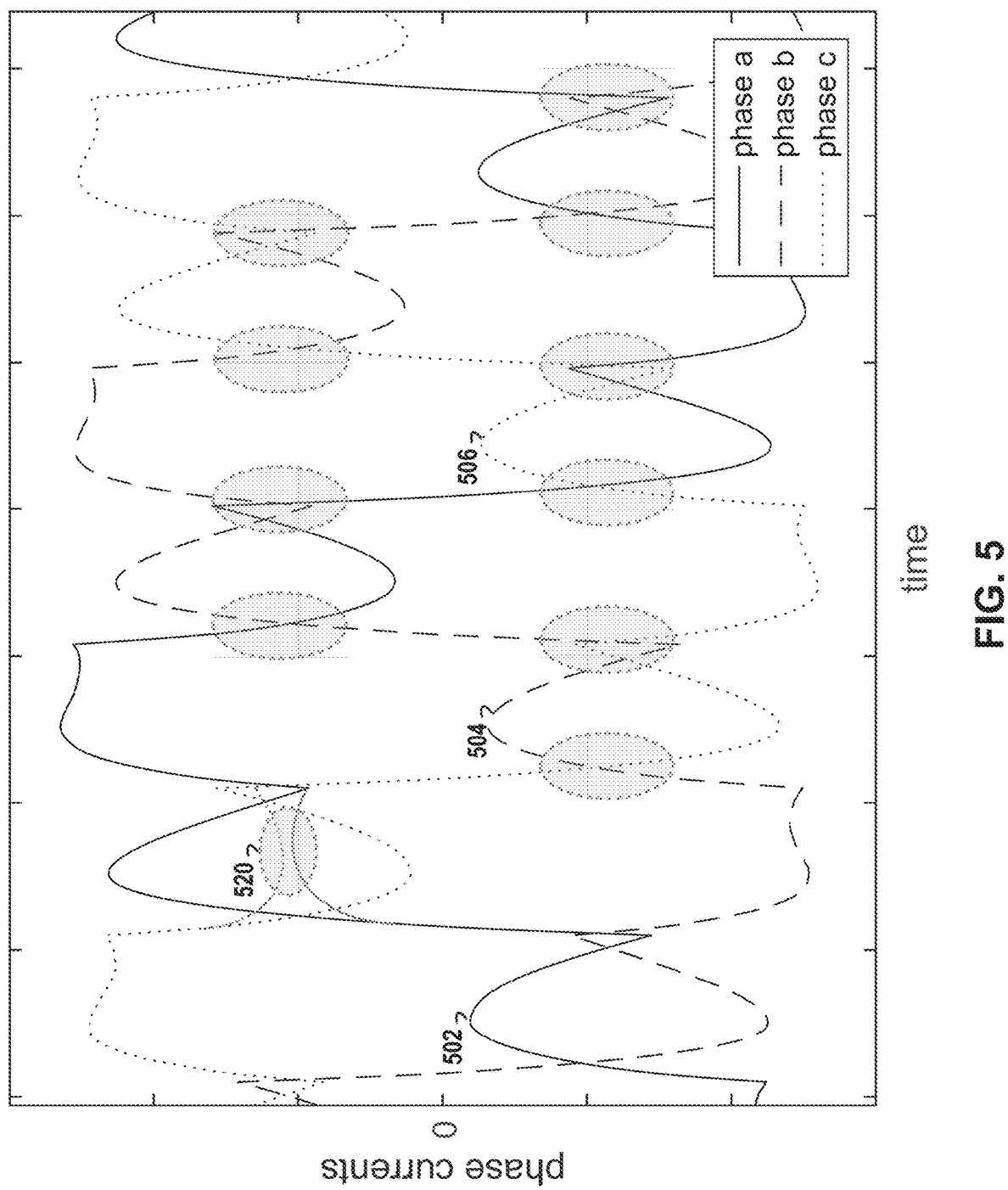
FIG. 5 is a conceptual chart illustrating an example of phase currents for a motor with second example commutation events, in accordance with one or more techniques of this disclosure.

FIG. 5 is a conceptual chart illustrating an example of phase currents for a motor with second example commutation events, in accordance with one or more techniques of this disclosure. The abscissa axis of FIG. 5 represents time (t) and the ordinate axis of FIG. 5 represents a first phase current signal 502, a second phase current signal 504, and a third phase current signal 506. The example of FIG. 5 is discussed with reference to FIGS. 1-4 for example purposes only.

Control circuitry 120 may generate, for each sector the detection of the commutation event based on a current difference analysis. Under normal conditions, an expected sequence of the current difference signal may occur between a first selected phase signal and a second selected phase signal, control circuitry 120 may determine the commutation event has occurred as follows.

To determine that a commutation event has occurred, control circuitry 120 may the configured to determine that a difference between the first selected phase signal and the second selected phase signal is increasing from a local minimum for the first cycle. For example, control circuitry 120 may determine that a current difference between a first selected phase signal (e.g., third phase current signal 506) and a second selected phase signal (e.g., first phase current signal 502) is decreasing until 0 (e.g., a first phase current crossing). In this example, control circuitry 120 may determine that the current difference is still decreasing until a local minimum is reached. In this example, motor circuitry 102 may determine that the current difference is increasing again (e.g., a second phase current crossing). If the second phase current crossing is detected (e.g., increasing from the local minimum), control circuitry 120 may determine that a commutation event 520 has occurred (e.g., end of wait step/analysis step).

To improve the robustness of the motor control algorithm additional criteria (exceptions) may be defined to generate commutation events in case the sequence described above cannot be reliably detected. If the timeout level has been reached, motor circuitry 102 may generate a commutation event (e.g., an end of wait step or an analysis step). If no crossing point is detected, motor circuitry 102 may determine a titneout level for a forced sector increase. If the timeout level has been reached, a commutation event (end of wait step/analysis step) may be generated. For instance, motor circuitry 102 (e.g., control circuitry 120) may be configured to initiate a timer in response to the generation of the control signal for controlling motor 104 based on the first angle of stator voltage vector for the motor associated with the first sector. In this example, to determine that the commutation event has occurred for the first sector, motor circuitry 102 (e.g., control circuitry 120) may be configured to determine the timer has exceeded a predetermined threshold time. In some examples, motor circuitry 102 (e.g., control circuitry 120) may be configured to determine a timeout level for a forced sector increase if only one crossing point is detected. One a complete cycle is finished, motor circuitry 102 may start the next cycle again with sector 1.

Figure 6:
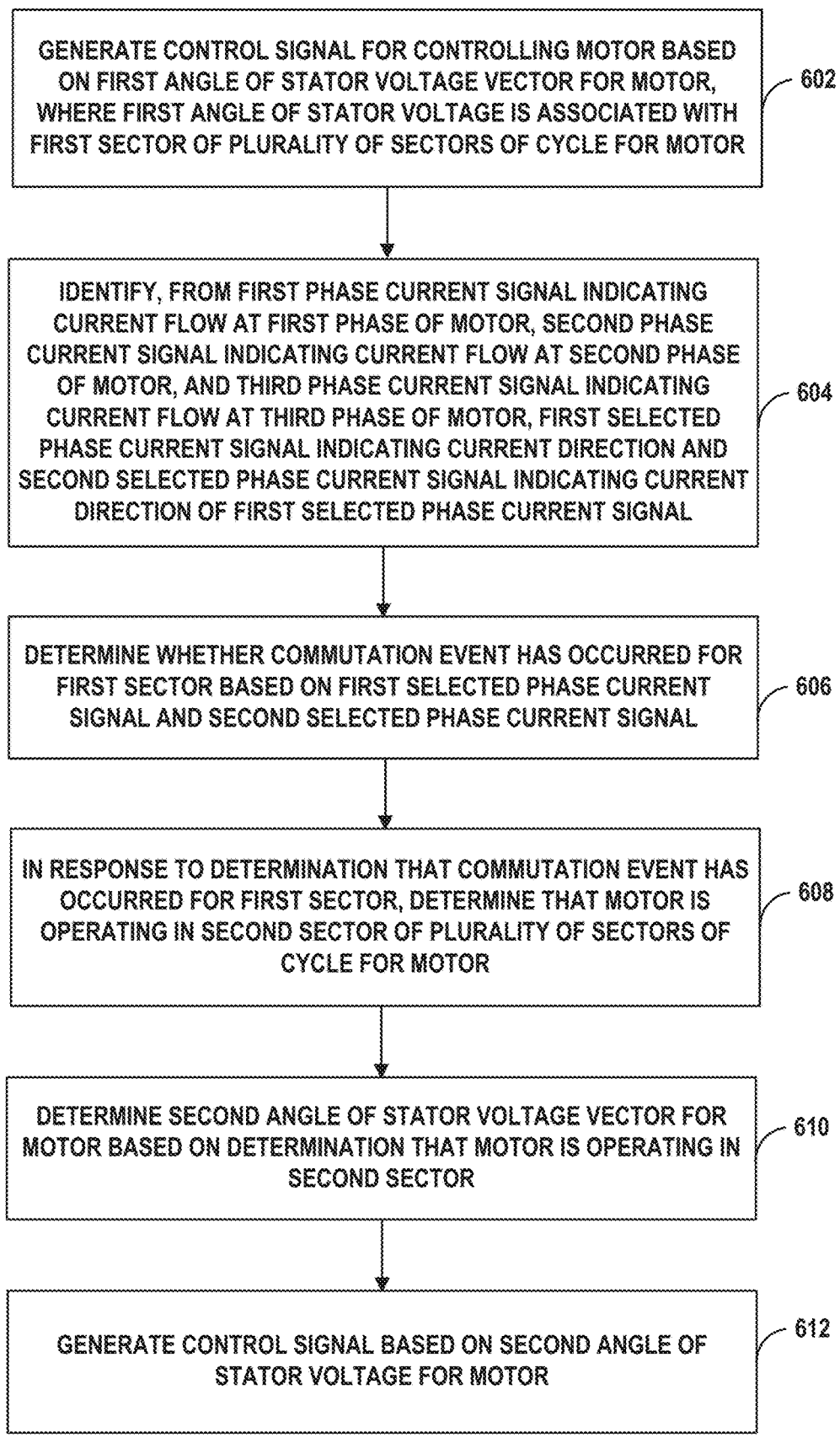
FIG. 6 is a flow diagram consistent with techniques that may be performed by the example system of FIG. 1, in accordance with this disclosure.

FIG. 6 is a flow diagram consistent with techniques that may be performed by the example system of FIG. 1, in accordance with this disclosure. FIG. 6 is discussed with reference to FIGS. 1-5 for example purposes only. In other examples, other systems or devices may also perform techniques of FIG. 6.

In accordance with the techniques of the disclosure, control circuitry 120 may generate a control signal for controlling motor 104 based on a first angle of stator voltage vector for motor 104, where the first angle of stator voltage vector is associated with a first sector of a plurality of sectors of a cycle for motor 104 (602). Control circuitry 120 may identify, from a first phase current signal indicating current flow at a first phase of motor 104, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal (604). For example, control circuitry 120 may identify the third phase current signal as the first selected phase current signal and the first phase current signal as the second selected phase current signal when both the first phase current signal and the second phase current signal are positive and the second phase current signal is negative.

Control circuitry 120 may determine whether a commutation event has occurred for the first sector based on the first selected phase current signal and the second selected phase current signal (606). For example, control circuitry 120 may determine, at a first time, that the first selected phase signal changes from being greater than the second selected phase signal to less than the second selected phase signal and determine, at a second time, that the first selected phase signal changes from being less than the second selected phase signal to greater than the second selected phase signal (see FIG. 4). In some examples, control circuitry 120 may determine that the commutation event has occurred for the first sector in response to a determination that a difference between the first selected phase signal and the second selected phase signal is increasing from a local minimum for the first cycle (see FIG. 5).

In response to a determination that the commutation event has occurred for the first sector, control circuitry 120 may determine that motor 104 is operating in a second sector of the plurality of sectors of the cycle for motor 104 (608). For example, control circuitry 120 may increment the sector from sector 1 to sector 2, sector 2 to sector 3, sector 3 to sector 4, sector 4 to sector 5, sector 5 to sector 6, or sector 6 to sector 1. While this example uses 6 sectors, in other examples, control circuitry 120 may be configured to use fewer than 6 sectors or more than 6 sectors.

Control circuitry 120 may determine a second angle of stator voltage vector for motor 104 based on the determination that motor 104 is operating in the second sector (610). For example, control circuitry 120 may determine the second angle of stator voltage vector to be incremented by 60 degrees from the first angle of stator voltage vector. Control circuitry 120 may generate the control signal based on the second angle of stator voltage vector for motor 104. For example, control circuitry 120 may be configured to output the control signal to driver circuitry 122. Driver circuitry 122 may be configured to drive motor 104 based on the control signal. For example, driver circuitry 122 may generate phase voltages at motor 104 based on the control signal.

In some examples, control circuitry 120 may be configured to initiate a timer in response to the generation of the control signal for controlling motor 104 based on the first angle of stator voltage vector for the motor associated with the first sector. In this example, to determine that the commutation event has occurred for the first sector, control circuitry 120 may be configured to determine the timer has exceeded a predetermined threshold time.

In some examples, control circuitry 120 may determine a rotor speed for motor 104 based on a duration of a first sector. In this example, control circuitry 120 may determine a control voltage amplitude based on the rotor speed. Control circuitry 120 may generate the control signal to indicate the control voltage amplitude. For instance, control circuitry 120 may apply proportional integral (PI) control based on the rotor speed. In some instances, however, control circuitry 120 may apply techniques other than PI control to generate the control signal to indicate the control voltage amplitude.

The following examples may illustrate one or more aspects of the disclosure.

Clause 1: A circuit for controlling a motor, the circuit comprising control circuitry configured to: generate a control signal for controlling the motor based on a first angle of stator voltage vector for the motor, wherein the first angle of stator voltage vector is associated with a first sector of a plurality of sectors of a cycle for the motor; identify, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal; determine whether a commutation event has occurred for the first sector based on the first selected phase current signal and the second selected phase current signal; in response to a determination that the commutation event has occurred for the first sector, determine that the motor is operating in a second sector of the plurality of sectors of the cycle for the motor; determine a second angle of stator voltage vector for the motor based on the determination that the motor is operating in the second sector; and generate the control signal based on the second angle of stator voltage vector for the motor.

Clause 2: The circuit of clause 1, wherein, to determine that the commutation event has occurred for the first sector, the control circuitry is configured to: determine, at a first time, that the first selected phase signal changes from being greater than the second selected phase signal to less than the second selected phase signal; and determine, at a second time, that the first selected phase signal changes from being less than the second selected phase signal to greater than the second selected phase signal.

Clause 3: The circuit of clause 1, wherein, to determine that the commutation event has occurred for the first sector, the control circuitry is configured to determine that a difference between the first selected phase signal and the second selected phase signal is increasing from a local minimum for the first cycle.

Clause 4: The circuit of clause 1, wherein, to determine that the commutmion event has occurred for the first sector, the control circuitry is configured to determine that a difference between the first selected phase signal and the second selected phase signal is increasing from a local minimum for the first cycle before the first selected phase signal changes from being greater than the second selected phase signal to less than the second phase signal.

Clause 5: The circuit of clauses 1-4, wherein the control circuitry is configured to initiate a timer in response to the generation of the control signal for controlling the motor based on the first angle of stator voltage vector for the motor associated with the first sector; and wherein, to determine that the commutation event has occurred for the first sector, the control circuitry is configured to determine the timer has exceeded a predetermined threshold time, Clause 6: The circuit of clauses 1-5, wherein the control circuitry is configured to: determine a rotor speed for the motor based on a duration of the first sector determine a control voltage amplitude based on the rotor speed; and generate the control signal to indicate the control voltage amplitude.

Clause 7: The circuit of clause 6, wherein, to generate the control signal to indicate the control voltage amplitude, the control circuitry is configured to apply proportional integral control based on the rotor speed.

Clause 8: The circuit of clauses 1-7, wherein the second angle of stator voltage vector is incremented by 60 degrees from the first angle of stator voltage vector.

Clause 9: The circuit of clauses 1-8, wherein the plurality of sectors comprises 6 sectors.

Clause 10: The circuit of clauses 1-9, wherein the control circuitry is configured to output the control signal to driver circuitry and wherein the driver circuitry is configured to drive the motor based on the control signal.

Clause 11: The circuit of clause 10, wherein the circuit further comprises the driver circuitry.

Clause 12: A method comprising: generating a control signal hr controlling the motor based on a first angle of stator voltage vector for the motor, wherein the first angle of stator voltage vector is associated with a first sector of a plurality of sectors of a cycle for the motor; identifying, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal; determining whether a commutation event has occurred for the first sector based on the first selected phase current signal and the second selected phase current signal; in response to determining that the commutation event has occurred for the first sector, determining that the motor is operating in a second sector of the plurality of sectors of the cycle for the motor; determining a second angle of stator voltage vector for the motor based on the determination that the motor is operating in the second sector; and generating the control signal based on the second angle of stator voltage vector for the motor.

Clause 13: The method of clause 12, wherein determining that the commutation event has occurred for the first sector comprises: determining, at a first time, that the first selected phase signal changes from being greater than the second. selected phase signal to less than the second selected phase signal; and determining, at a second time, that the first selected phase signal changes from being less than the second selected phase signal to greater than the second selected phase signal.

Clause 14: The method of clause 12, wherein determining that the commutation event has occurred for the first sector comprises determining that a difference between the first selected phase signal and the second selected phase signal is increasing from a local minimum for the first cycle.

Clause 15: The method of clause 12, wherein determining that the commutation event has occurred for the first sector comprises determining that a difference between the first selected phase signal and the second selected phase signal is increasing from a local minimum for the first cycle before the first selected phase signal changes from being greater than the second selected phase signal to less than the second phase signal.

Clause 16: The method of clauses 12-15, further comprising: initiating a timer in response to generating the control signal for controlling the motor based on the first angle of stator voltage vector for the motor associated with the first sector; and wherein determining that the commutation event has occurred for the first sector comprises determining the timer has exceeded a predetermined. threshold time.

Clause 17: The method of any of clauses 12-16, further comprising: determining a rotor speed for the motor based on a duration of the first sector; determining a control voltage amplitude based on the rotor speed; and generating the control signal to indicate the control voltage amplitude.

Clause 18: The method of clause 17, wherein the second angle of stator voltage vector is incremented by 60 degrees from the first angle of stator voltage vector.

Clause 19: The method of clauses 12-18, wherein the second angle of stator voltage vector is incremented by 60 degrees from the first angle of stator voltage vector.

Clause 20: The method of clauses 12-19, wherein the plurality of sectors comprises 6 sectors.

Clause 21: A system comprising: a motor; driver circuitry configured to drive the motor based on a control signal; and control circuitry configured to: generate the control signal for controlling the motor based on a first angle of stator voltage vector for the motor, wherein the first angle of stator voltage vector is associated with a first sector of a plurality of sectors of a cycle for the motor; identify, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal; detemiine whether a commutation event has occurred for the first sector based on the first selected phase current signal and the second selected phase current signal; in response to a determination that the commutation event has occurred for the first sector, determine that the motor is operating in a second sector of the plurality of sectors of the cycle for the motor; determine a second angle of stator voltage vector for the motor based on the determination that the motor is operating in the second sector; and generate the control signal based on the second angle of stator voltage vector for the motor.

Clause 22: A non-transitory computer-readable storage medium having stored thereon instructions that, when executed, cause control circuitry to: generate a control signal for controlling the motor based on a first angle of stator voltage vector for the motor, wherein the first angle of stator voltage vector is associated with a first sector of a plurality of sectors of a cycle for the motor; identify, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal; determine whether a commutation event has occurred for the first sector based on the first selected phase current signal and the second selected phase current signal; in response to a determination that the commutation event has occurred for the first sector; determine that the motor is operating in a second sector of the plurality of sectors of the cycle for the motor; determine a second angle of stator voltage vector for the motor based on the determination that the motor is operating in the second sector; and generate the control signal based on the second angle of stator voltage vector for the motor.

Various aspects have been described in this disclosure. These and other aspects are within the scope of the following claims.

What is claimed is:

1. A circuit for controlling a motor, the circuit comprising control circuitry configured to:
    generate a control signal for controlling the motor based on a first angle of stator voltage vector for the motor, wherein the first angle of stator voltage vector is associated with a first sector of a plurality of sectors of a cycle for the motor;
    identify, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal, wherein the current direction comprises a positive current direction indicating that phase current is greater than zero or a negative current direction indicating that phase current is less than zero;
    determine whether a commutation event has occurred for the first sector based on the first selected phase current signal and the second selected phase current signal;
    in response to a determination that the commutation event has occurred for the first sector, determine that the motor is operating in a second sector of the plurality of sectors of the cycle for the motor;
    determine a second angle of stator voltage vector for the motor based on the determination that the motor is operating in the second sector; and
    generate the control signal based on the second angle of stator voltage vector for the motor.

2. The circuit of claim 1, wherein, to determine that the commutation event has occurred for the first sector, the control circuitry is configured to:
    determine, at a first time, that the first selected phase signal changes from being greater than the second selected phase signal to less than the second selected phase signal; and
    determine, at a second time, that the first selected phase signal changes from being less than the second selected phase signal to greater than the second selected phase signal.

3. The circuit of claim 1, wherein, to determine that the commutation event has occurred for the first sector, the control circuitry is configured to determine that a difference between the first selected phase signal and the second selected phase signal is increasing from a local minimum for the first cycle.

4. The circuit of claim 1, wherein, to determine that the commutation event has occurred for the first sector, the control circuitry is configured to determine that a difference between the first selected phase signal and the second selected phase signal is increasing from a local minimum for the first cycle before the first selected phase signal changes from being greater than the second selected phase signal to less than the second phase signal.

5. The circuit of claim 1,
    wherein the control circuitry is configured to initiate a timer in response to the generation of the control signal for controlling the motor based on the first angle of stator voltage vector for the motor associated with the first sector; and
    wherein, to determine that the commutation event has occurred for the first sector, the control circuitry is configured to determine the timer has exceeded a predetermined threshold time.

6. The circuit of claim 1, wherein the control circuitry is configured to:
    determine a rotor speed for the motor based on a duration of the first sector;
    determine a control voltage amplitude based on the rotor speed; and
    generate the control signal to indicate the control voltage amplitude.

7. The circuit of claim 6, wherein, to generate the control signal to indicate the control voltage amplitude, the control circuitry is configured to apply proportional integral control based on the rotor speed.

8. The circuit of claim 1, wherein the second angle of stator voltage vector is incremented by 60 degrees from the first angle of stator voltage vector.

9. The circuit of claim 1, wherein the plurality of sectors comprises 6 sectors.

10. The circuit of claim 1, wherein the control circuitry is configured to output the control signal to driver circuitry and wherein the driver circuitry is configured to drive the motor based on the control signal.

11. The circuit of claim 10, wherein the circuit further comprises the driver circuitry.

12. A method comprising:
    generating a control signal for controlling the motor based on a first angle of stator voltage vector for the motor, wherein the first angle of stator voltage vector is associated with a first sector of a plurality of sectors of a cycle for the motor;
    identifying, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal, wherein the current direction comprises a positive current direction indicating that phase current is greater than zero or a negative current direction indicating that phase current is less than zero;

determining whether a commutation event has occurred for the first sector based on the first selected phase current signal and the second selected phase current signal;

in response to determining that the commutation event has occurred for the first sector, determining that the motor is operating in a second sector of the plurality of sectors of the cycle for the motor;

determining a second angle of stator voltage vector for the motor based on the determination that the motor is operating in the second sector; and generating the control signal based on the second angle of stator voltage vector for the motor.

13. The method of claim 12, wherein determining that the commutation event has occurred for the first sector comprises:

determining, at a first time, that the first selected phase signal changes from being greater than the second selected phase signal to less than the second selected phase signal; and determining, at a second time, that the first selected phase signal changes from being less than the second selected phase signal to greater than the second selected phase signal.

14. The method of claim 12, wherein determining that the commutation event has occurred for the first sector comprises determining that a difference between the first selected phase signal and the second selected phase signal is increasing from a local minimum for the first cycle.

15. The method of claim 12, wherein determining that the commutation event has occurred for the first sector comprises determining that a difference between the first selected phase signal and the second selected phase signal is increasing from a local minimum for the first cycle before the first selected phase signal changes from being greater than the second selected phase signal to less than the second phase signal.

16. The method of claim 12, further comprising:

initiating a timer in response to generating the control signal for controlling the motor based on the first angle of stator voltage vector for the motor associated with the first sector; and wherein determining that the commutation event has occurred for the first sector comprises determining the timer has exceeded a predetermined threshold time.

17. The method of claim 12, further comprising:

determining a rotor speed for the motor based on a duration of the first sector;

determining a control voltage amplitude based on the rotor speed; and generating the control signal to indicate the control voltage amplitude.

18. The method of claim 17, wherein generating the control signal to indicate the control voltage amplitude comprises applying proportional integral control based on the rotor speed.

19. The method of claim 12, wherein the second angle of stator voltage vector is incremented by 60 degrees from the first angle of stator voltage vector.

20. The method of claim 12, wherein the plurality of sectors comprises 6 sectors.

21. A system comprising:

a motor;

driver circuitry configured to drive the motor based on a control signal; and control circuitry configured to:

generate the control signal for controlling the motor based on a first angle of stator voltage vector for the motor, wherein the first angle of stator voltage vector is associated with a first sector of a plurality of sectors of a cycle for the motor;

identify, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal, wherein the current direction comprises a positive current direction indicating that phase current is greater than zero or a negative current direction indicating that phase current is less than zero;

determine whether a commutation event has occurred for the first sector based on the first selected phase current signal and the second selected phase current signal;

in response to a determination that the commutation event has occurred for the first sector, determine that the motor is operating in a second sector of the plurality of sectors of the cycle for the motor;

determine a second angle of stator voltage vector for the motor based on the determination that the motor is operating in the second sector; and generate the control signal based on the second angle of stator voltage vector for the motor.

22. A non-transitory computer-readable storage medium having stored thereon instructions that, when executed, cause control circuitry to:

generate a control signal for controlling the motor based on a first angle of stator voltage vector for the motor, wherein the first angle of stator voltage vector is associated with a first sector of a plurality of sectors of a cycle for the motor;

identify, from a first phase current signal indicating current flow at a first phase of the motor, a second phase current signal indicating current flow at a second phase of the motor, and a third phase current signal indicating current flow at a third phase of the motor, a first selected phase current signal indicating a current direction and a second selected phase current signal indicating the current direction of the first selected phase current signal, wherein the current direction comprises a positive current direction indicating that phase current is greater than zero or a negative current direction indicating that phase current is less than zero;

determine whether a commutation event has occurred for the first sector based on the first selected phase current signal and the second selected phase current signal;

in response to a determination that the commutation event has occurred for the first sector, determine that the motor is operating in a second sector of the plurality of sectors of the cycle for the motor;

determine a second angle of stator voltage vector for the motor based on the determination that the motor is operating in the second sector; and generate the control signal based on the second angle of stator voltage vector for the motor.

* * * * *